United States Patent [19]
Lafuse

[11] Patent Number: 5,878,430
[45] Date of Patent: Mar. 2, 1999

[54] OBJECT ATTRIBUTE HANDLER

[75] Inventor: Bradley A. Lafuse, Willowick, Ohio

[73] Assignee: Allen-Bradley Company, LLC, Milwaukee, Wis.

[21] Appl. No.: 717,023

[22] Filed: Sep. 20, 1996

[51] Int. Cl.[6] .................................................. G06F 7/00
[52] U.S. Cl. ........................ 707/103; 707/101; 707/2; 707/205
[58] Field of Search .......................... 707/1–7, 100–104, 707/200–206, 500–501; 704/8–9

[56] References Cited

U.S. PATENT DOCUMENTS

| | | | |
|---|---|---|---|
| 4,914,590 | 4/1990 | Loatman et al. | 364/267 |
| 5,339,392 | 8/1994 | Risberg et al. | 707/501 |
| 5,668,998 | 9/1997 | Mason et al. | 395/701 |

*Primary Examiner*—Thomas G. Black
*Assistant Examiner*—David Yink Jung
*Attorney, Agent, or Firm*—John M. Miller; John J. Horn; William R. Walbrun

[57] ABSTRACT

A object oriented attribute handle for parsing and packing object attributes for communication thereof between virtual and physical devices in an object oriented programming environment. The handle comprising the steps of creating a plurality of attribute description files for each class of object instances and either parsing or packing instance attributes in accordance with a corresponding one of the plurality of attribute description files. The handle using a suite of routines to parse or pack instance attributes in accordance with the corresponding predefined attribute description file.

10 Claims, 10 Drawing Sheets

OBJECT ATTRIBUTE HANDLER

FIELD OF INVENTION

This invention relates generally to handling software object attributes and, more particularly, it relates to parsing and packing instance attributes for communication of those attributes between virtual and physical devices in an object oriented programming environment.

BACKGROUND OF THE INVENTION

The usage of network file systems ("NFS") permit remote files to be treated as a "virtual file" which resides locally on a desktop. Moreover, NFSs permit sharing and manipulation of centrally located information without the burden of added complexity. In another context, NFSs permit remote hardware to appear as virtual devices which reside locally in a desktop computer or workstation. As one example, automated controllers whose physical components may reside near the devices they control can be made to appear as a "virtual device" which resides in the desktop computer or workstation.

In general the virtual device approach provides software objects which logically behave as if the hardware device itself is locally resident on the desktop PC or workstation. The advantage of this approach is to effectively hide the complexity of communications, data caching and refreshing, persistent storage, and on-line/off-line functionality from the user interface applications. In short, the goal of the virtual device approach is to abstract out as much detail as possible for potential clients.

The ASA virtual device architecture developed by Allen-Bradley Company, Inc., the assignee of the present application comprises a set of objects which provide functionality for supporting all of the complex behavior mentioned above. This set of objects can be used as the basis of creating specific virtual objects for representing any of a family of devices. For example, a developer can use this platform to create a virtual automation controller module which comprises many classes of objects such as a Task, Program, Data, Memory and I/O Map objects. Each of the classes, in turn, comprise a plurality of instances or specific individual objects wherein the instances of each class have similar attributes.

At times it is desirable to inspect or set all or some of the attributes associated with any of the instances which make up a particular object within a module. In the past this has been accomplished via a set of functional interfaces that handled each attribute on an individual basis. While this method works well in a system with few attributes, it becomes unmanageable when many attributes are involved. This is especially true when an attribute's format changes as this requires changes to every reference to that attribute in every software object.

Accordingly, there is a present need for a method for handling instance attributes in a system comprised of many classes of instances each having a plurality of attributes wherein attributes are not required to be handled on an individual basis. More generally, there is a present need for a method of communicating instance attributes between virtual and physical devices in a more efficient manner.

SUMMARY OF THE INVENTION

The present invention is directed toward an object oriented attribute handle for parsing and packing object instance attributes based upon predefined attribute description files (ADF's) which are specifically created for each class of objects. The ADFs are also implemented at run time in conjunction with an attribute parser utility to create structures for placing attributes and related information. When instance attributes are required to be communicated between virtual and physical devices the attribute description file for the object class of the particular instance is loaded into memory. Thereafter, a suite of table driven routines handle the packing or parsing of attribute data for sending and receiving during communications transmissions.

The present invention is implemented in a body of re-useable computer code which provides an architecture such that any software object instance which appropriately complies with an ADF format can be automatically parsed or packed for outgoing or incoming communications, respectively. In general, the re-useable ADF stores information about how a structure is laid out in memory. In use, table driven routines are invoked for interpreting the objects information based upon the ADF for the purpose of automatic formatting. Additionally, when only a select few of an instance's attributes are changed a method sending only those changed attributes is employed which can significantly reduce transmission overhead.

An important aspect of the ADFs are that they de-couple the re-useable parsing and packing code from individual object instances. As such, new class objects can be supported by an existing ADF so long as the structural layout of the information is in a compatible format.

It is therefore an object of the present invention to provide reusable software code which comprises the generic format of a class of object instances.

It is a further object of the present invention to provide software code which can be implemented at run time to create object instance structures in a predefined format.

It is yet another object of the present invention to provide an object oriented attribute handler for implementation on a computer in an object oriented framework comprising a plurality of instances, each instance falling within a corresponding class, each one of the plurality of instances comprising a set of attributes, a class being defined by a common set of attributes, the computer comprising a memory element coupled to a communications link for transmitting and receiving attributes. The attribute handler comprising a plurality of attribute description files, each attribute description file comprising attribute format information corresponding to the common set of attributes of one of the plurality of classes and a first routine for packing at least one attribute value from the set of attributes of any of the plurality of instances through the steps of loading a selected instance from the plurality of instances into the memory element to form a first memory structure, loading a corresponding attribute description file from the plurality of attribute description files into the memory element, the corresponding attribute description file corresponding to the class of the selected instance, locating a corresponding memory position for each at least one attribute value within the first memory structure based upon the attribute format information of the corresponding attribute description file, successively moving each at least one attribute value from the first memory structure to the communications link in a serialized stream based upon the corresponding memory position.

It is yet another object of the present invention to provide an object oriented attribute handler for implementation on a computer in an object oriented framework comprising a plurality of instances, each instance falling within a corresponding class, each one of the plurality of instances comprising a set of attributes, a class being defined by a common set of attributes, the computer comprising a memory element coupled to a communications link for receiving attributes. The attribute handler comprising a plurality of attribute description files, each attribute description file comprising attribute format information corresponding to the common set of attributes of one of the plurality of classes and a routine for parsing a received serialized attribute data stream comprising at least one received attribute value, the received serialized attribute data received in response to a request identifying a particular instance and a list of attributes, the second routine including the steps of loading the particular instance identified in request into the memory element to form a second memory structure, loading a second corresponding attribute description file from the plurality of attribute description files into the memory element, the second corresponding attribute description file corresponding to the class of the particular instance, identifying a receiving order of each at least one received attribute value within the received serialized data stream, successively removing each at least one received attribute value from the received serialized data stream based on the attribute format information and the receiving order, loading each parsed at least one received attribute value into the second memory structure based upon the attribute format information.

It is yet another object of the present invention to provide an object oriented attribute handler for automatically parsing and packing instance attributes for communication between a virtual and physical device in an object oriented programming environment.

These and other objects will be set forth below in the drawings and detailed description of the preferred embodiment.

DETAILED DESCRIPTION OF THE PREFERRED EMBODIMENT

The method for handling object attributes of the present invention is principally implemented and described in the context of an automation controller system 10 but may be applied in any object-oriented program comprised of classes of objects wherein the object instances within each class are substantially identical in form and behavior but contain different data in their attribute variables. In an object-oriented program environment an "object" is a closely related set of data (attributes) and behavior that supplies a set of services and the term "instance" is used to identify a specific, individual occurrence of an object within a class. In ASA there are several classes of objects which together perform a well defined set of functions one of which is a communication module in an automation controller.

Figures 1, 2:
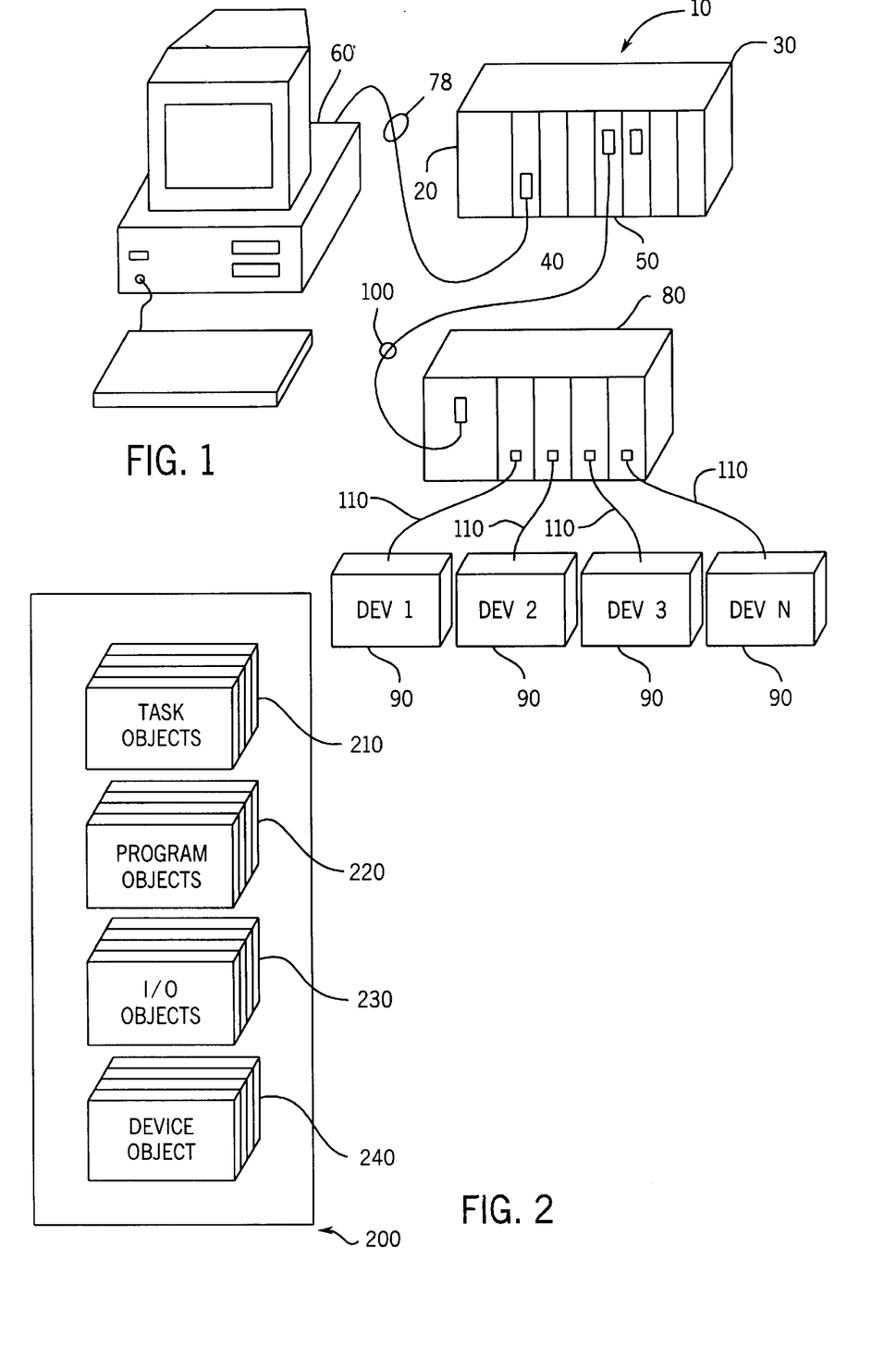
FIG. 1 is a physical representation of an automation controller connected to a network in accordance with the preferred embodiment of the present invention.
FIG. 2 is an object oriented representation of an automation controller device in accordance with the preferred embodiment of the present invention.

FIG. 1 depicts a physical representation of an automation controller system 10 for reference in describing the method of handling object attributes of the present invention. In particular, automation controller system 10 is comprised of an automation controller module 20 mounted in an integrated control platform (ICP) chassis 30. The ICP chassis 30 also houses several other modules including I/O modules 40 and 50 for example. Chassis 30 may also house other modules including a Control Net™ communication module or other modules as are known in the automation field. In the system shown, communications module 40 is an ethernet interface module which provides a link between the modules connected to the backplane of chassis 30 and the workstation 60 over communications link 70. The terminal 60 may be, for example, a workstation loaded with an image of the automated controller system 10. Through terminal 60 an operator may set or inspect one or more of the attributes associated with the objects that define the modules of the automated controller system 10 through a set of services described below.

The automation controller 20 is further connected to devices 90 via an I/O module 50 which provides an interface between the backplane of chassis 30 and I/O module 80 over communications link 100 and may be a DeviceNet™ port, for example. In turn, I/O module 80 is connected via communications links 110 to devices 90 which perform some action upon or sense a particular condition in the automation controller system 10. In use, the automation controller 20 continuously executes a program to control the plurality of devices 90 in a manner defined by the program during which time devices 90 communicate with controller 20 through I/O module 80.

FIG. 2 depicts an automation controller module 200 as it may be represented in an object oriented programming environment. As shown, automation controller module 200 is comprised of several classes of objects such as Task Objects 210, Program Objects 220, I/O Objects 230, a Device Object 240 and other objects as defined in the ASA system, for example. Object classes 210–230 comprise a plurality of instances which are uniquely identifiable by an internal object identifier also referred to as an IOI. Importantly, each of the instances within classes 210–240 comprise a plurality of class attributes which are found in each instance of the class and instance attributes which are not necessarily found within each instance of the class.

Figure 3:
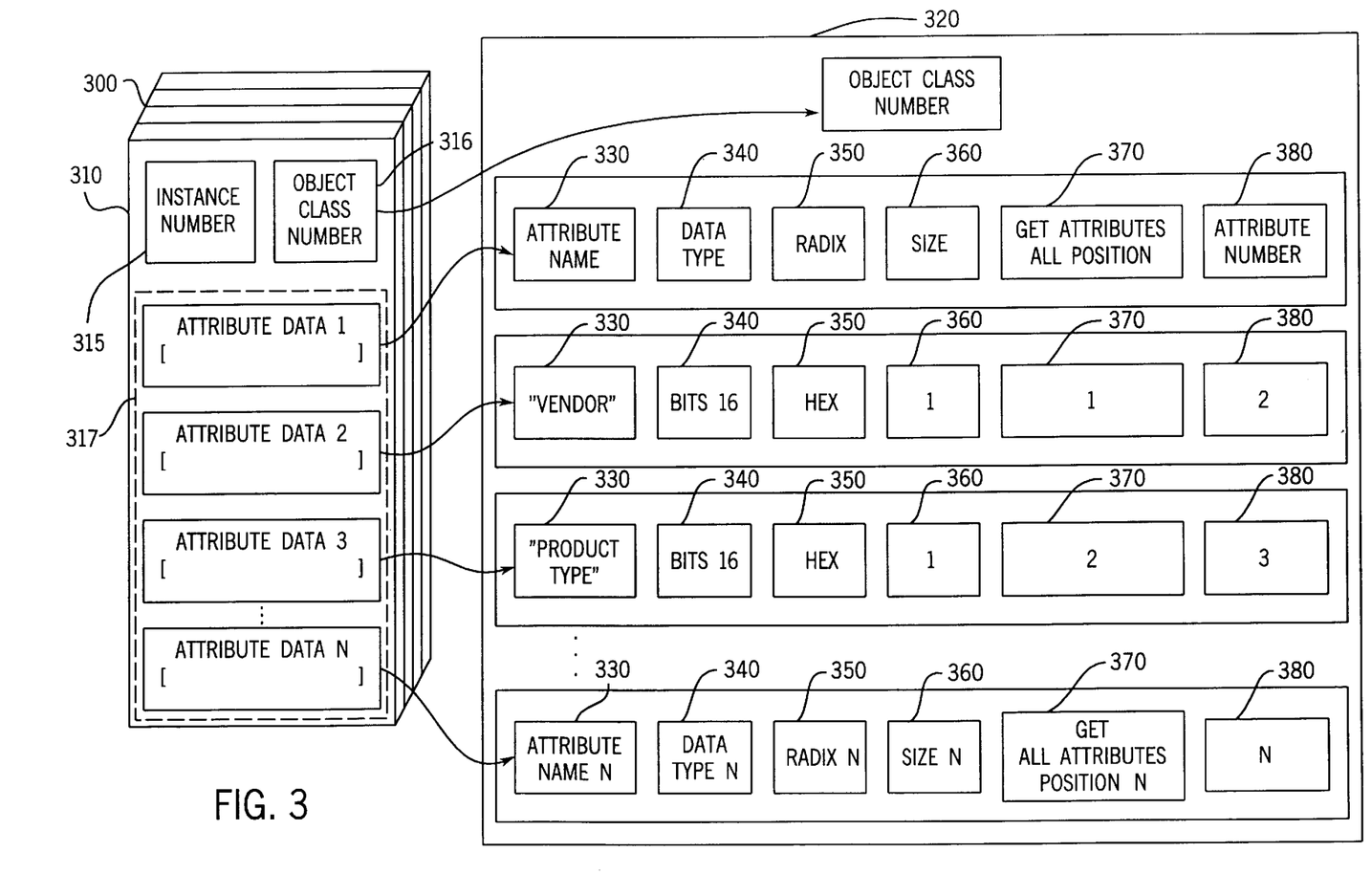
FIG. 3 is an instance structure and corresponding attribute description file in accordance with the preferred embodiment of the present invention.

With reference to FIG. 3 there is shown a class of object instances 300 including a device object instance 310, which is used to provide identification and general information about a physical module, and a corresponding ADF 320. Instance 310 comprises an instance number 315, class object number 316 and is further comprised of class and instance attribute data 317 which is further described in tables 1 and 2 below. The combined instance number 315 and object number 316 comprise the IOI referenced above. As indicated in table 1, a device object instance comprises the following class attributes:

TABLE 1

Device Class Attributes

| Attribute ID | Name | Data Type | Description of Attribute |
|---|---|---|---|
| 1 | Revision | UINT | Revision of this object |

Similarly, a device object may contain the following instance attributes indicated in table 2 below.

TABLE 2

Device Instance Attributes

| Attribute ID | Name | Data Type | Description of Attribute |
|---|---|---|---|
| 1 | Vendor | UINT | Identification of each vendor by number |
| 2 | Product Type | UINT | Indication of general type of product |
| 3 | Product Code | UINT | Identifies a product among a particular product type |
| 4 | Revision<br>Major Rev.<br>Minor Rev. | STRUCT of:<br>USINT<br>USINT | Series Number<br>Revision Number |
| 5 | Status | WORD | |
| 6 | Serial_Number | UDINT | Product Serial No. |
| 7 | Product name<br>Length<br>Contents | STRUCT of:<br>USINT<br>STRING[32] | Product Name |

In general, each class attribute and instance attribute is defined by an attribute ID, attribute name, attribute data type and of course the attribute data which is represented in a format defined by the data type. The abbreviations found in the column labeled data type generally follow IEC 1131-3 entitled Industrial Control and Systems Programmable Languages published by NEMA, Washington, D.C. wherein the term UINT refers to an unsigned integer comprising 16 bits and the term USINT refers to unsigned short integer comprising 8 bits. Similarly, the declaration STRUCT specifies that data elements of that type contain sub-elements of specified types which can be accessed by the specified attribute names.

Attributes may be further defined by the services they support. For example, as discussed below, when a particular class or instance supports any variation of the Get_Attributes_All or Set_Attributes_All services the attributes will further be defined by a Get_Attributes_All position 370 as shown in FIG. 3. Position 370 is used by the table driven routines when packing and parsing serialized data that is being transmitted or received respectively.

Corresponding to object instance 310, ADF 320 comprises several pieces of information including attribute names 330, data types 340, radix information 350, size information 360, Get_Attributes_All positions 370 and attribute numbers 380. Attribute information 330–370 is generic to any particular instance 310 contained within class 300 and thus is reusable for all instances of that class. Attribute name 330 is an alpha-numeric string and in the case where the instance is a device instance the attribute names may be any of those listed in table 1 and 2 above. In addition to the description above data type 340 also indicates the number of bits the attribute data will comprise and the radix 350 indicates the base, such as hex, upon which to interpret the bits. Size 360 indicates the number of bytes the attribute comprises and Get_Attributes_All position 370 indicates the location within a serialized string a particular attribute resides when a response is received to the Get_Attributes_All service described below. Additionally, attribute numbers 380 are part of the ADF information and are generated when the ADF is loaded into memory for use by the parsing and packing routines in conjunction with the services described below.

Table 3 below sets forth a plurality of services that may be supported by a class of object instances. For the purposes of this specification the services 400–700 depicted herein are described with reference to the "Device" class of object instances for exemplary purposes only, however, the invention is not limited to such. Importantly, some classes may not support all services. With reference to table 3, the four services set forth are all related to transmitting or receiving instance attributes between a workstation and a module. For example each of the services shown may be requested by an operator located at workstation 60 to set or get attributes associated with the physical automation controller module 20.

TABLE 3

Services Supported by Certain Class Objects

| Service Code | Service Name | Description of Service |
|---|---|---|
| $01_{hex}$ | Get_Attributes_All | Returns contents of all attributes in an object |
| $02_{hex}$ | Set_Attributes_All | Sets contents of all attributes in an object |
| $03_{hex}$ | Get_Attributes_List | Returns contents of specified attributes in an object |
| $04_{hex}$ | Set_Attributes_List | Sets contents of specified attributes in an object |

Figure 4:
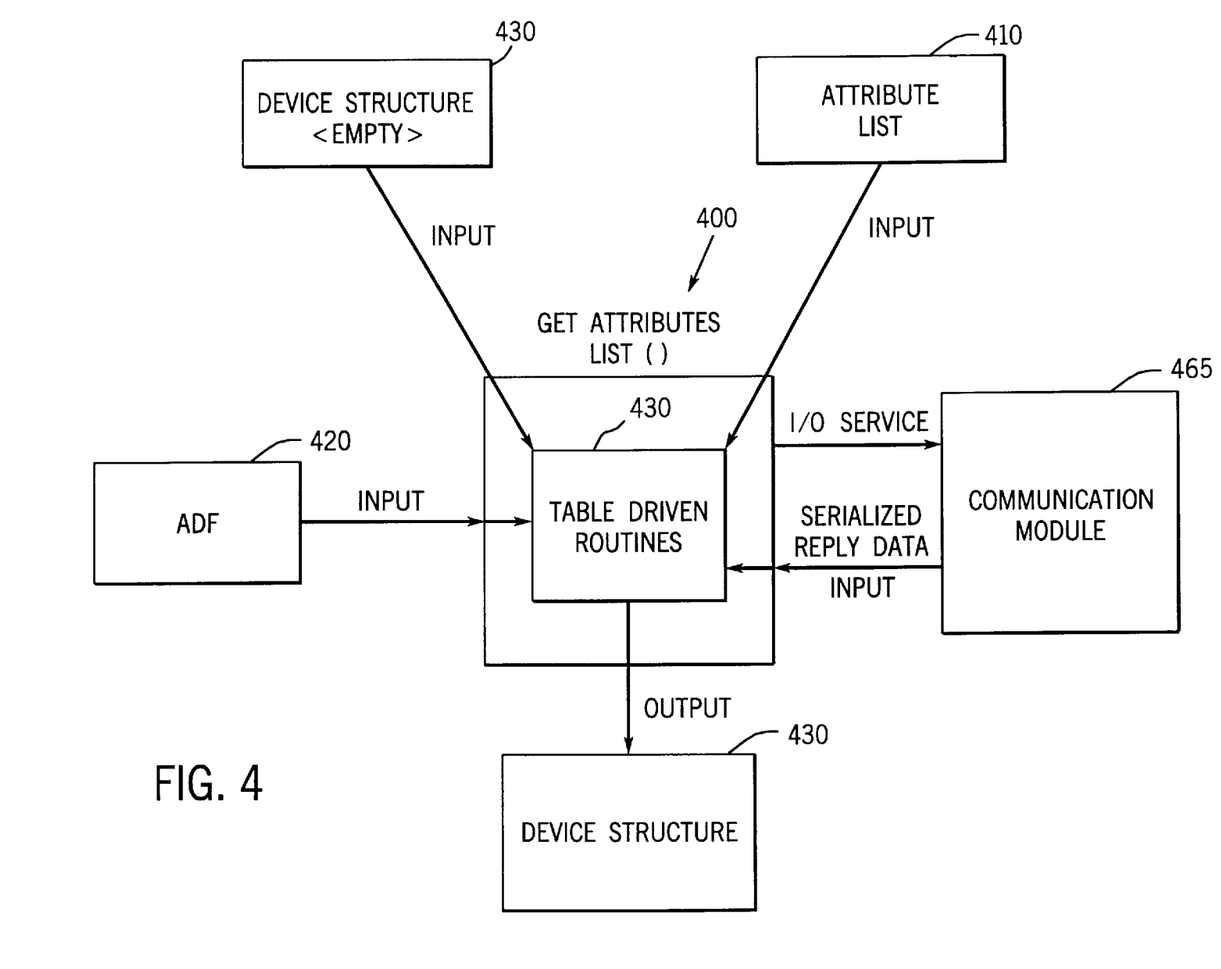
FIG. 4 is a flow diagram illustrating the Get_Attributes_List service in accordance with the preferred embodiment of the present invention.

With reference to FIG. 4 there is shown a flow diagram of the Get_Attributes_List service 400 identified in table 3 above. An operator or requester of service 400 who may be located at workstation 60, for example, inputs the service code for the service requested, the internal object identifier (IOI) of the instance to be acted upon and in the case where the service is the Get_Attributes_List service 400 the requester also inputs an attribute list 410 which comprises an attribute_count and attribute_list as shown in table 4 below.

TABLE 4

Service Request Parameters for Get_Attributes_List

| Name | Data Type | Description of Parameter |
| --- | --- | --- |
| attribute_count | UINT | Number of attribute numbers in the attribute list |
| attribute_list | Array of UINT's | List of the attribute numbers of the attributes to get from the class or object |

In response, an I/O service request containing the service code, IOI and parameters identified in table 4 are loaded from the workstation's 60 memory into a local communication module 465 which transmits the service request over link 70 to module 40. In turn, module 40 communicates the request over the backplane of chassis 30 to the automation controller module 20 which produces a response to the request. The serialized response is then communicated in the reverse order back to the local communication module 465. As shown in tables 5 and 6 the serialized response comprises an attribute_count and data_of_attribute structure comprising the attribute_numbers, attribute_values and status information (not shown in the table) for the list of attributes requested. Thereafter, the ADF 420 corresponding to the IOI specified class and the structure 430 corresponding to the IOI specified instance are loaded into the memory of workstation 60. Structure 430 is a pre-defined space in the memory of the workstation where the instance attributes are stored. Subsequently, table driven routines parse the serialized data according to the information contained within the ADF and output the parsed attributes to the structure 430

TABLE 5

Response Parameters for Get_Attributes_List

| Name | Data Type | Description of Parameter |
| --- | --- | --- |
| attribute_count | UINT | Number of values being returned |
| data_of_attribute | STRUCT | |

TABLE 6

Structure Components of the Data_of_Attribute

| Attribute Name | Data Type | Description of Parameter |
| --- | --- | --- |
| attribute_number | UINT | Number |
| attribute_value | | |

Figure 5:
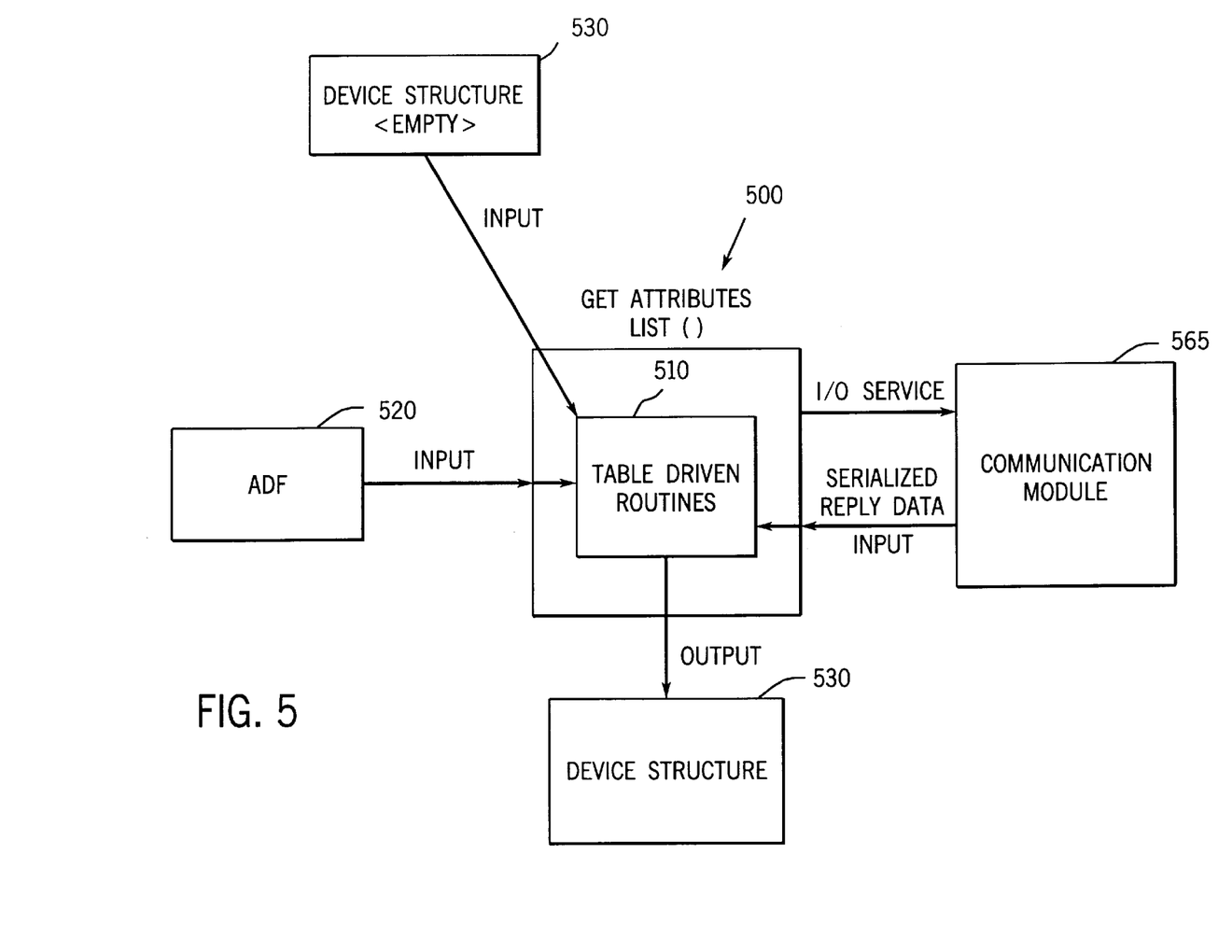
FIG. 5 is a flow diagram illustrating the Get_Attributes_All service in accordance with the preferred embodiment of the present invention.

With reference to FIG. 5 there is shown a flow diagram of a Get_Attributes_All service 500. In general, the Get_Attributes_All service 500 returns the contents of all the gettable attributes of an IOI specified instance from controller 20. Since all of the instance attributes are being requested the service request parameters only require the service code and the IOI of the target instance. Similar to service 400, the service request parameters are loaded from the workstation's 60 memory to the local communication module 565 which transmits the request over link 70 to module 40. Module 40 then communicates the service request over the backplane of chassis 30 to automation controller 20. The automation controller 20 processes the request and responds with a serialized response which is communicated in the reverse order back to the workstation's 60 local communication module 565. The serialized reply comprises the attribute_data structure as shown in table 7. Thereafter, the ADF 520 corresponding to the IOI specified class and the structure 530 corresponding to the IOI specified instance are loaded into memory. Subsequently, table driven routines 510 parse the serialized data according to the attribute information contained within the ADF and output the parsed attributes to the structure 530.

TABLE 7

Response Parameters for Get_Attributes_All

| Name | Data Type | Description of Parameter |
| --- | --- | --- |
| attribute_data | Object/class attribute specific STRUCT as defined in Table 2. | Data is specific to the attributes |

Figure 6:
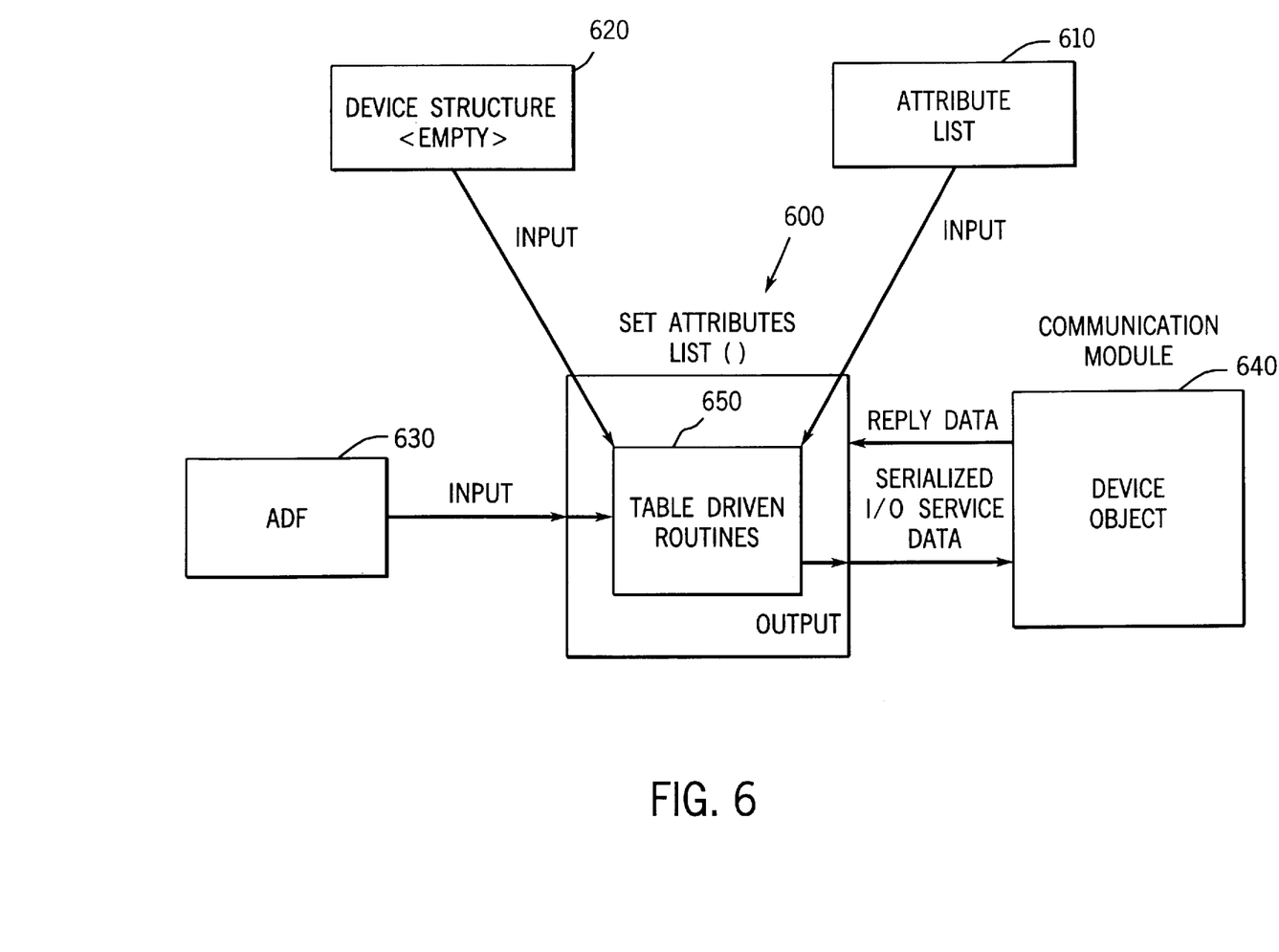
FIG. 6 is a flow diagram illustrating the Set_Attributes_List service in accordance with the preferred embodiment of the present invention.

Similar to the "Get" type services mentioned above the device class objects may further support the Set_Attributes_List service 600 shown in FIG. 6. Service 600 permits an operator located at workstation 60, for example, to set or change particular attributes of an IOI specified instance. As with the "Get" type services, the requester of service 600 which may be an operator located at workstation 60 inputs the service code for the service requested, the IOI of the instance to be acted upon and in the case where the service is the Set_Attributes_List service 600 the requester also inputs an attribute list 610 which comprises attribute_count and attribute_number information as shown in tables 8 and below. The data_of_attribute parameter comprises the attribute_numbers and attribute_values that the requester wishes to set in the IOI specified instance.

TABLE 8

Service Request Parameters for Set_Attributes_List

| Name | Data Type | Description of Parameter |
| --- | --- | --- |
| attribute_count | UINT | Number of attribute numbers in the attribute list |
| data_of_attributes | Array of system-defined STRUCT | Array of structures specific to this service. |

TABLE 9

Structure Components of the Data_of_Attribute

| Attribute Name | Data Type | Description of Parameter |
| --- | --- | --- |
| attribute_number | UNIT | Number of attribute value being set |
| attribute_value | Object/Class attribute-specific STRUCT | Sequence of attribute data |

Once the attribute count and data_of_attributes is input by the operator or other source, the Set_Attributes_List service 600 loads the device structure 620 and corresponding ADF 630 into the memory of workstation 60. Thereafter, table driven routines 630 pack attribute list data 610 into a serialized output which is loaded into the workstation's local communication module 640 for communication over link 70 to I/O module 40. In turn, module 40 communicates the message over the backplane of chassis 30 to automation controller module 20 where the listed attributes are set according to the attribute_value information obtained from the device structure 620. Once the attributes are successfully set module 20 responds back to workstation 60 indicating that the attributes have been successfully loaded into the controller.

Figure 7:
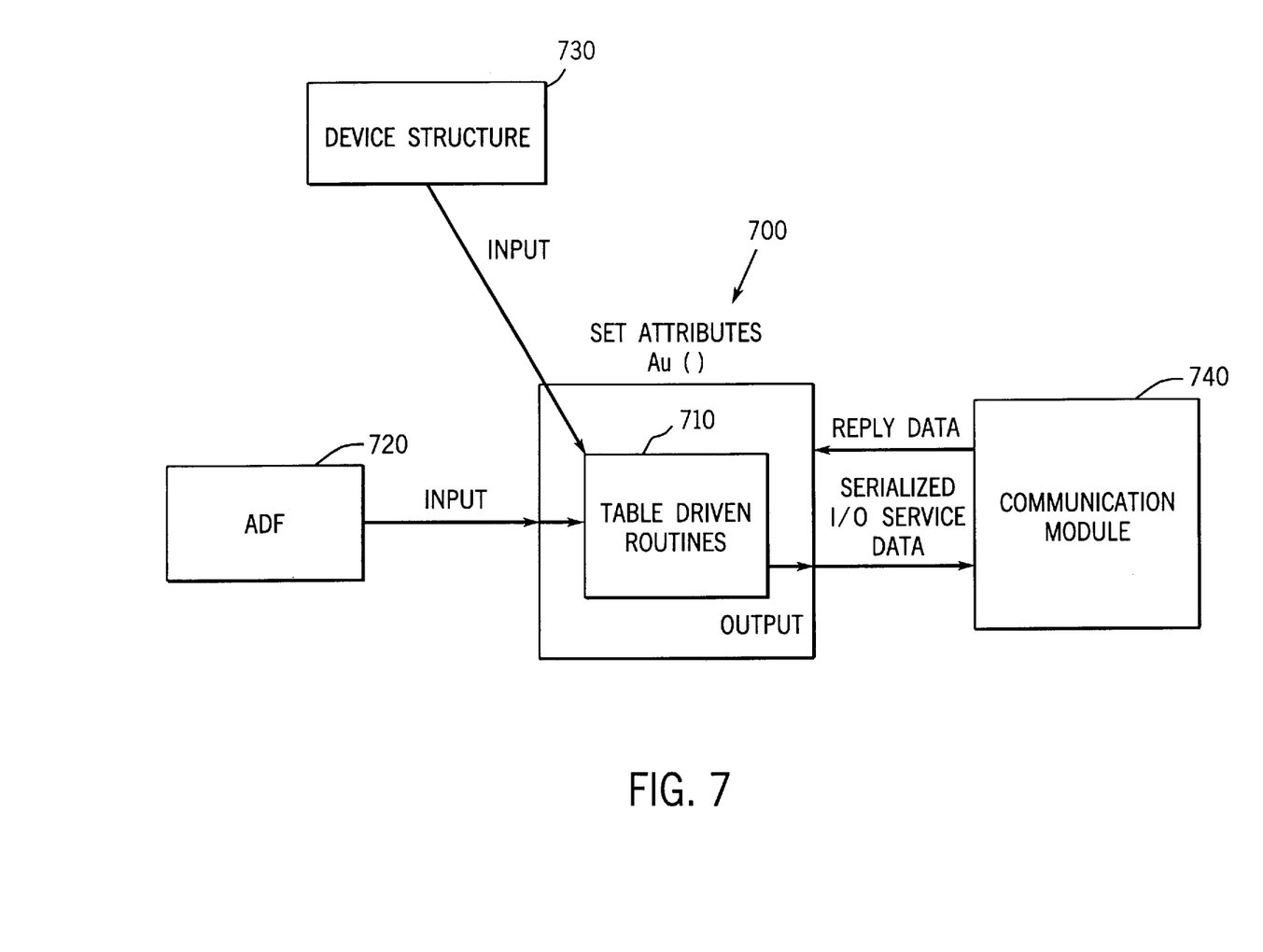
FIG. 7 is a flow diagram illustrating the Set_Attributes_All service in accordance with the preferred embodiment of the present invention.

With reference to FIG. 7 there is shown a flow diagram of the Set_Attributes_All service 700 which permits the requester of the service to set all of the attributes for an IOI specified instance. In use, the requester of service 700 inputs the service code for the service requested and the IOI of the instance to be acted upon. Thereafter, the corresponding ADF 720 and device structure 730 which comprises the attribute_data as shown in table 10 are loaded into memory and table driven routines 710 parse the attribute_data into a serialized stream for transmission via the local communication module 740 to the automation controller 20.

TABLE 10

Service Request Parameters for Set_Attributes_All

| Name | Data Type | Description of Parameter |
|---|---|---|
| attribute_data | Object/Class attribute-specific STRUCT | Sequence of attribute data |

TABLE DRIVEN ROUTINES

Figure 8:
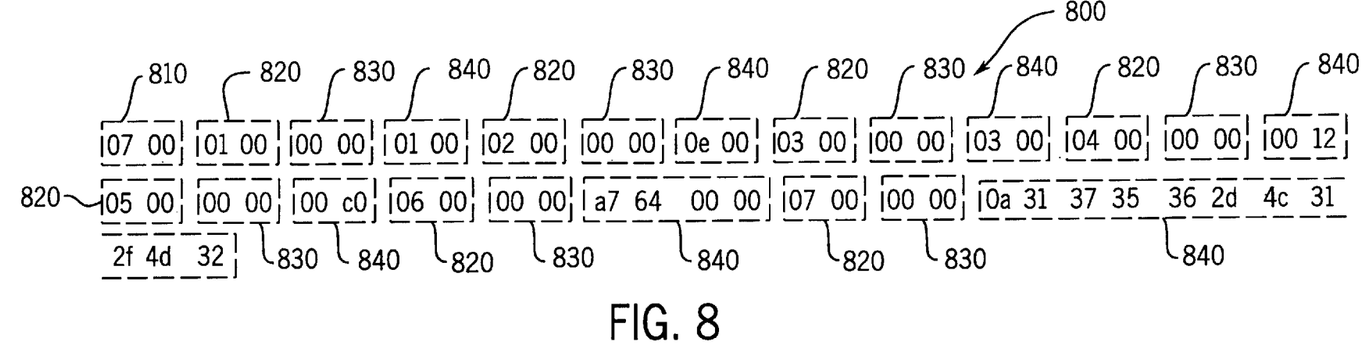
FIG. 8 is an example of a serialized reply received in response to the Get_Attributes_List service request in accordance with the preferred embodiment of the present invention.

With respect to FIG. 8 there is shown a serialized stream of reply data 800 sent from a module 20 in response to the Get_Attributes_List service 400 shown in FIG. 4.

The reply data 800 is generally comprised of four types of information 810–840. Specifically, data 810 is a two byte field which represents the number of attribute values returned in the reply data 800. Data 820 represents the attribute number associated with the next attribute value 840. Data 830, comprises a minimum two byte field containing status information which indicates whether their are any errors in the transmitted attribute value 840. In particular, when the two bytes are 00 00 the foregoing attribute value 840 is deemed error free. However, a non zero data indicates a variable length data field which will be stripped off the reply data 800 as discussed below. Finally, the last data 840 is the attribute value which may vary in length depending on the particular attribute.

Figures 9, 11:
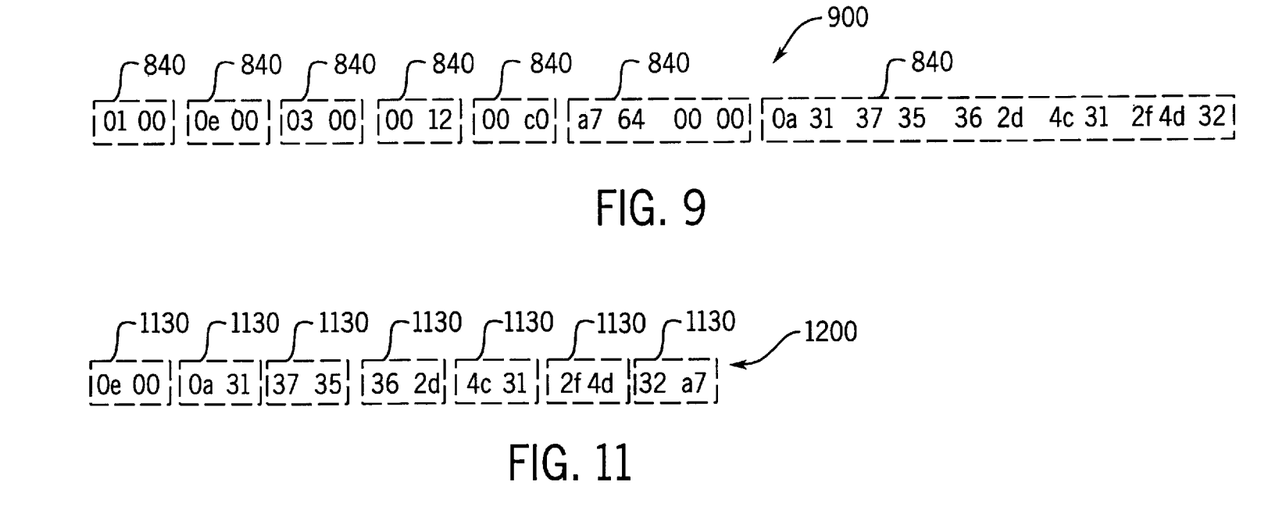
FIG. 9 comprises the data values of certain object attributes in accordance with the preferred embodiment of the present invention.
FIG. 11 is an example of a serialized reply received in response to the Get_Attributes_All service request in accordance with the preferred embodiment of the present invention.

Subsequent to the receipt of reply data 800 a first routine is executed which strips the data 810, 820 and 830 from data 800 resulting in the serialized stream of data 900 as shown in FIG. 9. Thereafter, the filtered reply data 900 is parsed one attribute value 840 at a time and each attribute value is moved into the empty device attribute structure 430 shown in FIGS. 4 and FIG. 10.

More specifically, the corresponding ADF 420 for the object class is loaded into memory for access by the table driven routines 440. Additionally, the attribute list 410 which comprises the attribute_list service request parameter shown in table 4 is input to the table driven routines 440. Importantly, the order of the attributes in the attribute_list service request parameter dictates the order of the attributes in the reply data 800 and subsequently the order of the attribute values 840 shown in FIG. 9.

Using the attribute list information 410 comprising the attribute_list service request parameters, table driven routines 440 identify the order of the attribute numbers in the attribute_list service request parameter and then locate the corresponding attribute information 330–370 in the ADF 420 based on each attribute number 380. Once the information is read from the ADF 420, table driven routines 400 can look up the size 360 of each attribute 840 and parse off the appropriate number of bytes from the stream of bytes 900 shown in FIG. 9. For example, when the first attribute in the attribute_list request parameter is attribute number 1, table driven routines 440 identify the size 360 of the corresponding attribute data 840 which in this case is two bytes. Accordingly, the first two bytes, 01 00, are parsed off of the stream 900. Thereafter, the bytes are loaded into the structure 430 at offset 0 as 0001 as described below. It is important to note that the byte order is encoded low to high in the reply data. In a similar manner, the process continues for each attribute in the attribute list 410 until each attribute 840 has been parsed off the stream of bytes 900.

Figure 10:
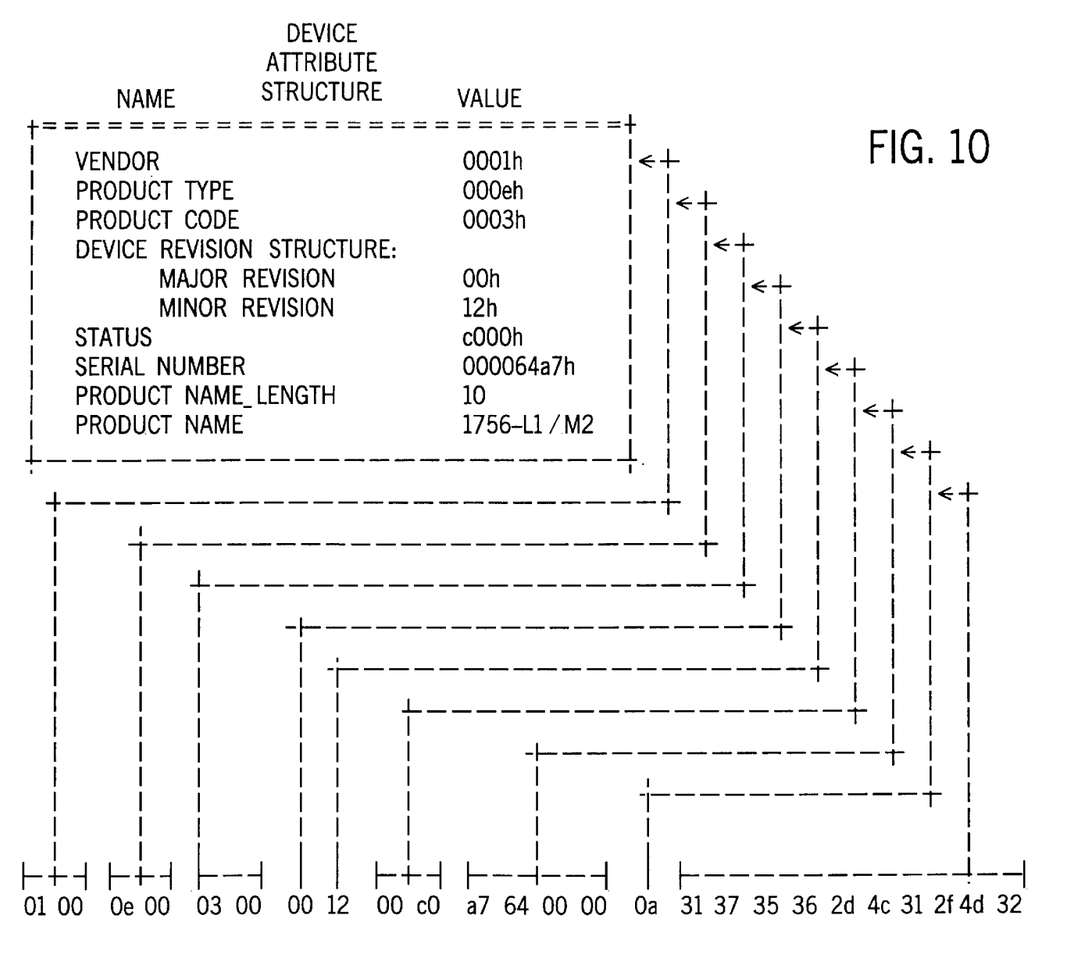
FIG. 10 illustrates the position of certain data values within a device structure in accordance with the preferred embodiment of the present invention.

Once parsed from the stream 900 the attribute number identified from the attribute_list request parameter is further used to identify the relative offset from the beginning of the device attribute structure 430 in which to store the attribute value 840. Moreover, the offset is calculated using the size 360 in bytes of each previous attribute as defined in the ADF 420 to determine where in the structure 430 to place the attribute value 840. In particular, the position of each attribute value 840 in the structure 430 is calculated using the size 360 in bytes of each previous attribute in the ADF 420. An example of the calculated offsets for each attribute value 840 in the device structure 430 are shown in table 11. Once the offset has been calculated, the structure 430 is appropriately loaded with each of the attribute values 840 using standard C and C++ routines for a typical data structure as is shown in FIG. 10.

Importantly, the order of attributes in the ADF and therefore, the Device Instance Attribute table (Table 2), are not required to be in any particular order. Similarly, the order of the attributes in the Get_Attributes_List service request parameters does not have to be sequential as shown in the example given in FIGS. 9 and 10. As a result there is greater flexibility when setting up attribute lists.

TABLE 11

Device Structure

| Attribute Name | Offset |
|---|---|
| Vendor | 0 |
| Product Type | 2 |
| Product Code | 4 |
| Device Revision Structure | |
| Major Revision | 6 |
| Minor Revision | 7 |
| Status | 8 |
| Serial Number | 10 |
| Product Name_Length | 14 |
| Product Name | 15 |

Figure 12:
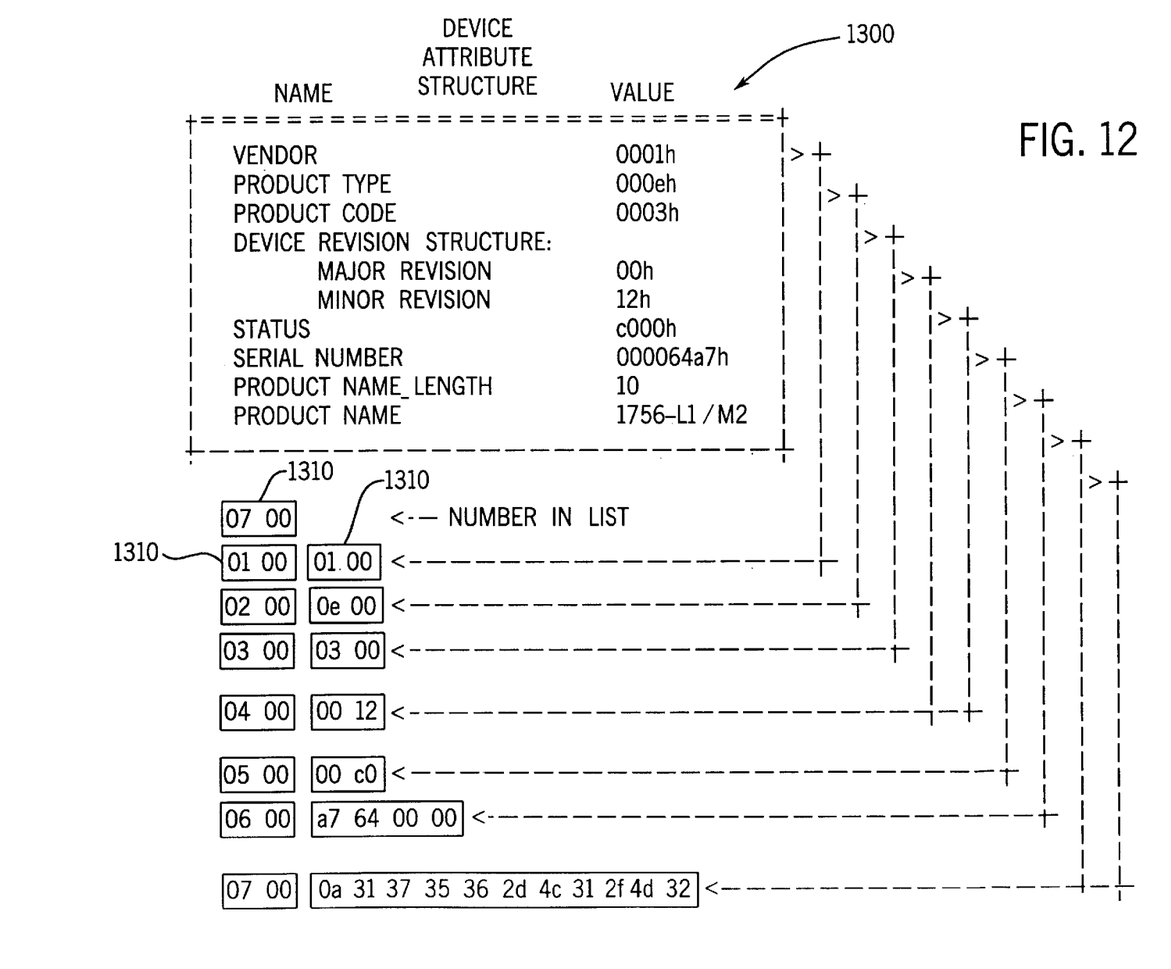
FIG. 12 is an example of a device attribute structure in accordance with the preferred embodiment of the present invention.

The table driven parsing and packing routines 510 are slightly modified when parsing the reply data received in response to the Get_Attributes_All service request 500. In particular, as discussed above and shown in FIG. 5 the Get_Attributes_All service does not utilize an attribute_list as part of its request parameters. Accordingly, the order of the attribute data cannot be derived from the order of the attribute numbers set forth in the request parameters. Rather, as shown in FIG. 3 the ADF 520 (FIG. 5) contains the Get Attributes All position 370 which defines the order of the attribute numbers and therefore the attribute values in the reply data 1100 as shown in FIG. 12. The response data for the Get_Attributes_All is a stream of bytes 1200 comprising only attribute values 1130. Subsequently, the table driven routines use the Get Attributes All Position 370 to determine the size 360 of each successive attribute and subsequently parse it off the stream 1200. Finally, as in the Get_Attributes_List service 400 the parsed attributes are loaded into the structure 530 by adding up the size 360 of all the preceding attributes to determine the offset in bytes from the beginning of the structure 530 in which to place each attribute value 1130.

The Set_Attributes_List service 600 is implemented by the table driven routines 640 in the manner described below. Service 600 permits the operator at workstation 60 to change all or some of the settable attributes in a particular object instance. When an object instance is modified in the virtual device or workstation 60, the changed attributes must be changed in the physical device if the virtual device is intended to match the physical device. Accordingly, the Set_Attributes_List service 600 is invoked to pack changed attributes into a serialized stream for transmission to the physical device. The packing routines which are part of the table driven routines 610 are implemented in a similar manner to the "Get" type routines described above. Importantly, the routines 610 are generic to all object instances of all classes and utilize an ADF to determine a particular instance's attribute format information.

With reference to FIG. 12 there is shown a device attribute structure 1300 which corresponds to either device structure 620 or 730 in FIGS. 6 and 7 respectively. Device structure 1300 is shown for example purposes only when describing the Set_Attributes_List service 600 and the Set_Attributes_All service 700.

Figure 13:
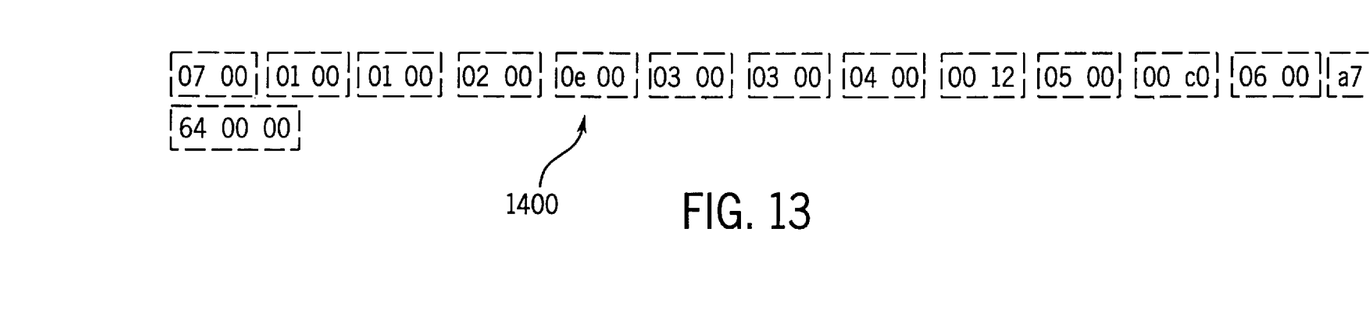
FIG. 13 comprises the serialized command data sent in response to a Set_Attributes_List service request in accordance with the preferred embodiment of the present invention.

With reference to FIG. 13 there is shown a stream of serialized Set_Attributes_List command data packed by table driven routines 610 in response to the Set_Attributes_List service request 600. In the example shown, the operator has selected to set the first six attributes in the physical device to those shown in the structure 1300. In accordance with the flow diagram shown in FIG. 6 the operator inputs the service code and attribute list comprising the attribute numbers of those attributes intended to be set in the physical device. Thereafter the device structure 620, or for the purposes of this example structure 1300, and the ADF 630 corresponding to the device class objects are loaded into memory. Subsequently, table driven routines 650 use the ADF 630 in conjunction with the attribute numbers in the attribute list 610 to pack the attribute values 1310 located in device structure 1300 into a serialized stream 1400 for communication to the physical device via communications module 640. In addition to the attribute values, the serialized stream 1400 also comprises the number of attributes 1410 in the serialized stream as well as the attribute numbers 1320 of each attribute value 1310.

In particular, table driven routines 600 use the attribute number provided in the attribute list 610 to look up its corresponding attribute description in the ADF 630. Once the corresponding attribute number is located in the ADF the relative offset of the corresponding attribute value 1310 from the beginning of the device attribute structure is calculated by summing the size 360, in bytes, of each previous attribute in the ADF. Thereafter, the attribute value 1310 is moved (or packed) from the device attribute structure 1300 into the serialized command data stream 1400 for transmission to the target module. Moreover, each attribute, one at a time is taken from the device attribute structure 1300 and moved into the serialized command data stream 1400 in the manner described above. For example, the first attribute in the list is attribute number 01 00, the vendor, and its size is two bytes. Accordingly, the attribute value 1310, bytes 01 00, are moved from the structure 1300 at offset 0 as 00 01 into the serialized command data stream 1400. This process continues for the number of attributes in the list.

Importantly, the order of attributes in the ADF file is not required to be sequential. Additionally, the order of attributes in the Set_Attributes_List request parameters (i.e. the attribute list 610) need not be sequential either. The latter provides greater flexibility when setting up attribute lists.

Figure 14:
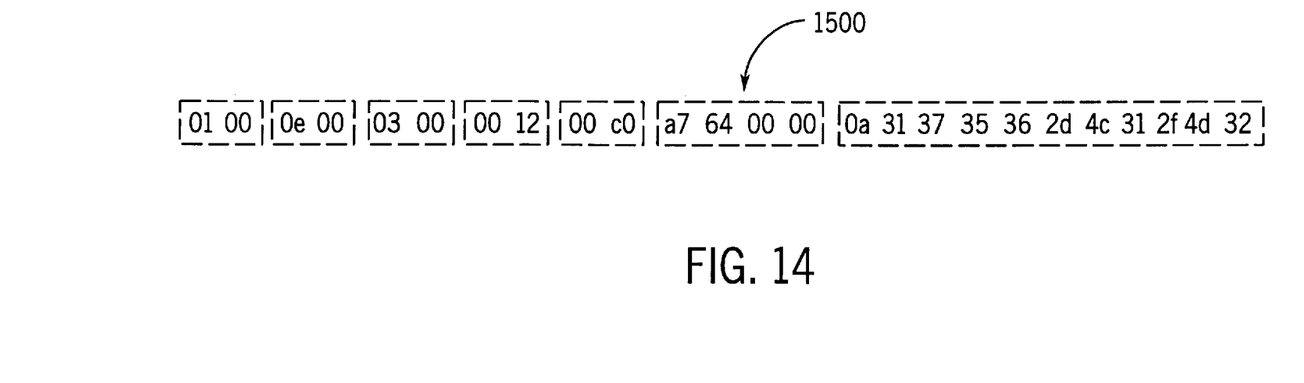
FIG. 14 comprises a serialized command data stream sent in response to a Set_Attributes_All service request in accordance with the preferred embodiment of the present invention.

FIG. 14 depicts the serialized command data stream 1500 generated in response to the Set_Attributes_All service 700 shown generally in FIG. 6. Similar to the Get_Attributes_All service 500, service 700 does not require an attribute list or attribute numbers as part of the service request parameters. Rather, since all settable attributes are going to be packed into the serialized stream 1500 (FIG. 15) the Get_Attribute_All_Position so only the ADF 720 and the structure 1300 are required. More specifically, the attribute values 1310 correspond to the Get_All_Attribute_Position in the ADF 720. Therefore, the table driven routines 710 look up the first attribute in the ADF 720 and determine its size 360 and subsequently move or pack the corresponding number of bytes, at the appropriate offset, from the structure 1300 into the serialized stream 1500. As before the offset is determined by summing up the size, in bytes, of all the previous attributes in the ADF 720. Since the attribute numbers are not included in the serialized stream 1500, the order of the attributes 1310 in the stream are in the same order as in the Get_All_Position in the ADF 720.

For clarity table driven routines 440, 510, 650 and 710 are generally intended to refer to a single collection of software routines which perform the functions as discussed above. Also the ADF's 420, 520, 630 and 720 are all the same file since a device class object is used for all the examples in the preferred embodiment. However, other ADF's are required for other classes of objects and those ADF's will correspond to the general format shown in FIG. 3.

Various modifications and alterations in the described method will be apparent to those skilled in the art from the foregoing description which does not depart from the spirit of the invention. For this reason, these changes are desired to be included in the scope of the appended claims. The appended claims recite the only limitations of the present invention and the descriptive matter which is employed for setting forth the present embodiment and is to be interpreted as illustrative and not limitative.

What we claim is:

1. An object oriented attribute handler for implementation on a computer in an object oriented framework comprising a plurality of instances, each instance falling within a corresponding class, each one of the plurality of instances comprising a set of attributes, a class being defined by a common set of attributes, the computer comprising a memory element coupled to a communications link for transmitting and receiving attributes, the attribute handler comprising:

a plurality of attribute description files, each attribute description file comprising attribute format information corresponding to the common set of attributes of one of the plurality of classes;

a first routine for packing at least one attribute value from the set of attributes of any of the plurality of instances through the steps of loading a selected instance from the plurality of instances into the memory element to form a first memory structure, loading a corresponding attribute description file from the plurality of attribute description files into the memory element, the corresponding attribute description file corresponding to the class of the selected instance, locating a corresponding memory position for each at least one attribute value within the first memory structure based upon the attribute format information of the corresponding attribute description file, successively packing each at least one attribute value from the first memory structure to the communications link into a serialized stream based upon the corresponding memory position.

2. The object oriented attribute handler according to claim 1 wherein the attribute format information comprises attribute size information comprising the size of each of the at least one attribute value.

3. The object oriented attribute handler according to claim 2 wherein the attribute format information further comprises:

corresponding attribute numbers for each of the at least one attribute values and locating the position of each at least one attribute value within the structure is determined from the attribute number and the attribute size information.

4. The object attribute handler according to claim 1 further comprising:

a second routine for parsing a received serialized attribute data stream comprising at least one received attribute value, the received serialized attribute data received in response to a request identifying a particular instance and a list of attributes, the second routine including the steps of loading the particular instance identified in request into the memory element to form a second memory structure, loading a second corresponding attribute description file from the plurality of attribute description files into the memory element, the second corresponding attribute description file corresponding to the class of the particular instance, identifying a receiving order of each at least one received attribute value within the received serialized data stream, successively removing each at least one received attribute value from the received serialized data stream based on the attribute format information of the second corresponding attribute description file and the receiving order, loading each parsed at least one received attribute value into the second memory structure based upon the attribute format information.

5. The object oriented attribute handler according to claim 4 wherein the attribute format information comprises:

corresponding attribute numbers; and
corresponding attribute size information;
wherein each of at least one received attribute value has a corresponding attribute number and a corresponding attribute size information and loading each of the at least one received attribute value within the second memory structure is based upon the corresponding attribute number and the corresponding attribute size information.

6. The object oriented attribute handler according to claim 4 wherein the attribute format information further comprises a get attributes all position for each of the at least one received attribute value, wherein when the handler is instructed to "get all attributes" the order of each at least one received attribute value within the serialized received attribute data stream is identified based upon the get attributes all position.

7. An object oriented attribute handler for implementation on a computer in an object oriented framework comprising a plurality of instances, each instance falling within a corresponding class, each one of the plurality of instances comprising a set of attributes, a class being defined by a common set of attributes, the computer comprising a memory element coupled to a communications link for transmitting and receiving attributes, the attribute handler comprising:

a plurality of attribute description files, each attribute description file comprising attribute format information corresponding to the common set of attributes of one of the plurality of classes;

a first routine for packing at least one attribute value from the set of attributes of any of the plurality of instances through the steps of loading a selected instance from the plurality of instances into the memory element to form a first memory structure, loading a corresponding attribute description file from the plurality of attribute description files into the memory element, the corresponding attribute description file corresponding to the class of the selected instance, locating a corresponding memory position for each at least one attribute value within the first memory structure based upon the attribute format information of the corresponding attribute description file, successively moving each at least one attribute value from the first memory structure to the communications link in a serialized stream based upon the corresponding memory position; and a second routine for parsing a received serialized attribute data stream comprising at least one received attribute value, the received serialized attribute data received in response to a request identifying a particular instance and a list of attributes, the second routine including the steps of loading the particular instance identified in request into the memory element to form a second memory structure, loading a second corresponding attribute description file from the plurality of attribute description files into the memory element, the second corresponding attribute description file corresponding to the class of the particular instance, identifying a receiving order of each at least one received attribute value within the received serialized data stream, successively removing each at least one received attribute value from the received serialized data stream based on the attribute format information of the second corresponding attribute description file and the receiving order, loading each parsed at least one received attribute value into the second memory structure based upon the attribute format information.

8. The object oriented attribute handler according to claim 7 wherein the attribute format information comprises corresponding attribute numbers; and
corresponding attribute size information;
wherein each of the at least one attribute value has a corresponding attribute number and a corresponding attribute size information and locating the position of the at least one transmittable attribute value within the structure is determined from the corresponding attribute number and the corresponding attribute size information.

9. An object oriented attribute handler for implementation on a computer in an object oriented framework comprising a plurality of instances, each instance falling within a corresponding class, each one of the plurality of instances comprising a set of attributes, a class being defined by a common set of attributes, the computer comprising a memory element coupled to a communications link for receiving attributes, the attribute handler comprising:

- a plurality of attribute description files, each attribute description file comprising attribute format information corresponding to the common set of attributes of one of the plurality of classes;
- a routine for parsing a received serialized attribute data stream comprising at least one received attribute value, the received serialized attribute data received in response to a request identifying a particular instance and a list of attributes, the second routine including the steps of
  - loading the particular instance identified in request into the memory element to form a second memory structure,
  - loading a second corresponding attribute description file from the plurality of attribute description files into the memory element, the second corresponding attribute description file corresponding to the class of the particular instance,
  - identifying a receiving order of each at least one received attribute value within the received serialized data stream,
  - successively removing each at least one received attribute value from the received serialized data stream based on the attribute format information and the order,
  - loading each parsed at least one received attribute value into the second memory structure based upon the attribute format information.

10. The object oriented attribute handler according to claim 9 wherein the attribute format information further comprises a get attributes all position for each at least one received attribute value, wherein when the handler is instructed to "get all attributes" the order of each at least one received attribute value within the serialized received attribute data stream is identified based upon the get attributes all position.

* * * * *